May 19, 1953 — C. A. POTTER — 2,638,872
FEED TROUGH
Filed May 29, 1948 — 2 Sheets-Sheet 1

INVENTOR
CHARLES A. POTTER
BY John B. Willard
ATTORNEY

May 19, 1953 C. A. POTTER 2,638,872
FEED TROUGH
Filed May 29, 1948 2 Sheets-Sheet 2
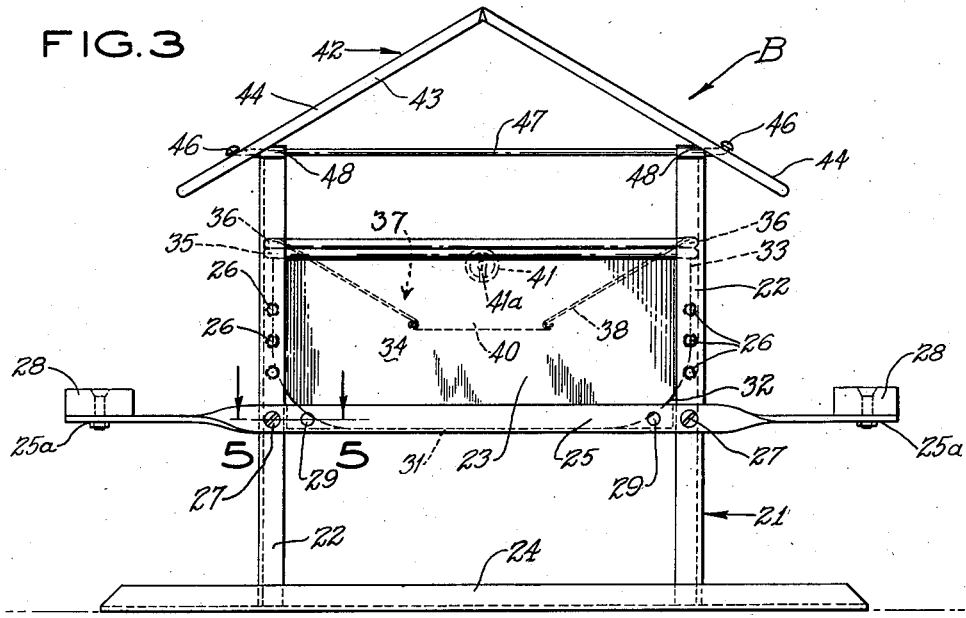
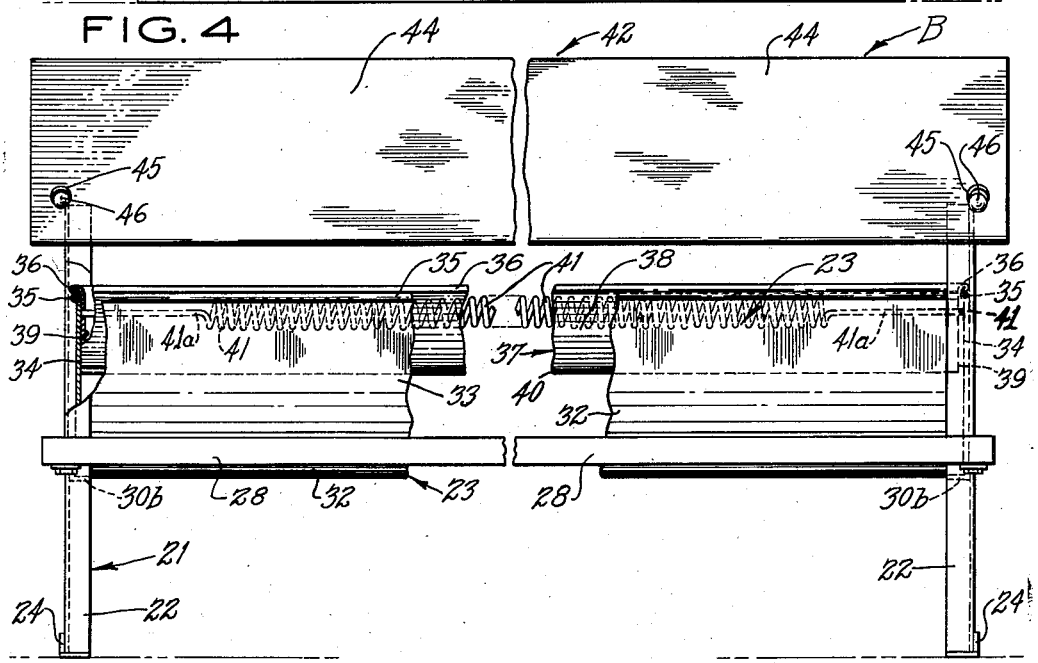
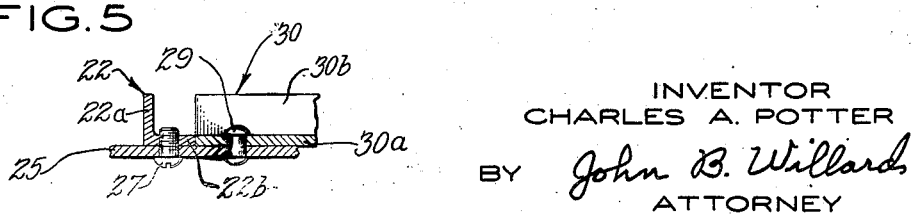
INVENTOR
CHARLES A. POTTER
BY John B. Willard
ATTORNEY Patented May 19, 1953

2,638,872

UNITED STATES PATENT OFFICE 2,638,872

FEED TROUGH

Charles A. Potter, Essex, Conn.

Application May 29, 1948, Serial No. 30,107

4 Claims. (Cl. 119—61)

The present invention relates to poultry feeders or hoppers which are made commonly of sheet metal.

A principal object of the invention is to provide a feeder that may be stocked readily with a quantity of mash, grain or other suitable poultry feed and that protects the feed from fouling and waste while making it easily and equally accessible to each bird of a considerable flock.

A further object is the provision of a feed hopper in which the feed is presented to the poultry only at an accessible and protected location or station to which the supply of feed from other portions of the hopper is automatically fed. In addition, the hopper saves and automatically supplies to the feeding station the greater portion of the feed which the birds remove and which, in the case of conventional hoppers would be lost and wasted, as for example, in the litter which is customarily provided in poultry houses. Inasmuch as old litter together with the wasted feed is frequently replaced with fresh litter, the present hopper, by greatly reducing this waste; makes possible a more economical use of the feed; and effects a considerable savings in the amount of feed which must be made available per bird.

A further object of the invention is to provide a hopper made of simply formed parts which may be disassembled and reassembled easily and quickly; may be cleaned when necessary, and refilled without the aid of tools; and which requires refilling infrequently.

Still another object of the invention is the provision of a feed hopper which is properly proportioned and sized for poultry of a particular size and which may be adjusted and made suitable for either young or older birds.

With these objects in view together with others which will become apparent, there is illustrated in the accompanying drawings two convenient forms or embodiments of the invention which are hereinafter fully described and with reference to which the invention is defined in the appended claims.

In the drawings:

Fig. 3 is an end view in elevation of a rectangular hopper constituting a second embodiment of the invention;

Fig. 4 is a side view in elevation of the hopper which is partially in section to reveal certain constructional features of the assembly; and Fig. 5 is a cross-sectional view on line 5—5 of Fig. 3 showing details of the frame assembly of the hopper.

Figure 1:
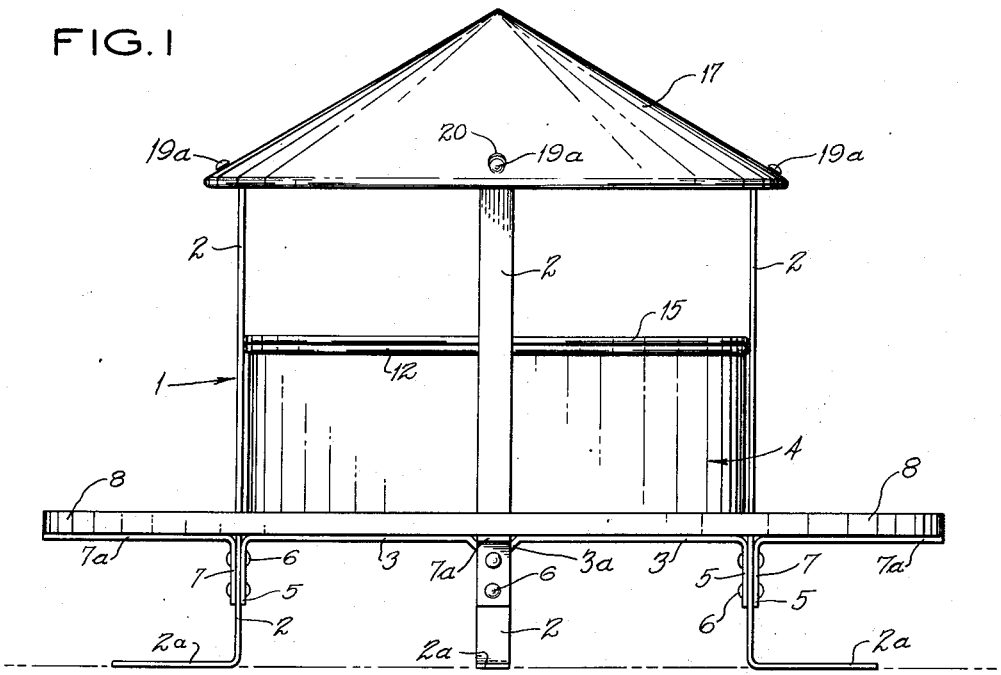
Fig. 1 is a side view in elevation of a circular cylindrical feed hopper built in accordance with the invention.
Figure 2:
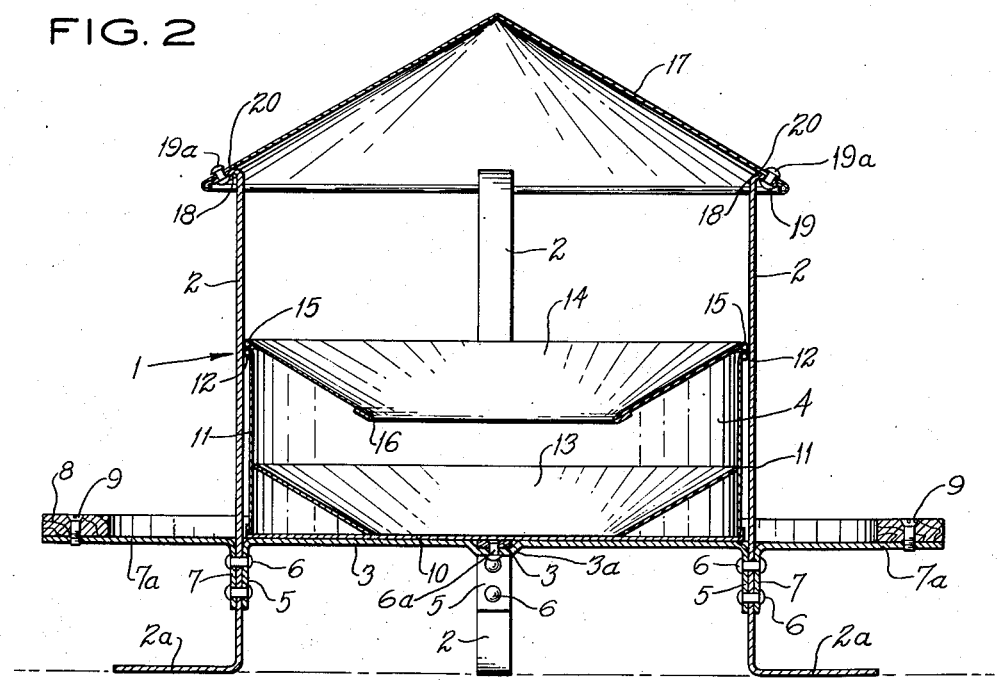
Fig. 2 is a transverse sectional view in elevation through a diameter of the hopper shown in Fig. 1.

Referring to Figs. 1 and 2 of the drawings, the circular cylindrical hopper there shown includes a frame designated generally by the numeral 1 having four vertical supports 2, which may be formed of strap iron or the like, each of which preferably is located an equal distance from the two adjacent ones, as at the corners of a square. A pair of cross-members 3 provide support for a circular cylindrical pan or container, generally designated by the numeral 4, which is described hereinafter in greater detail. The members 3 may be formed of the same stock as the posts 2 to which their right-angularly bent ends 5 are fastened securely. In the embodiment illustrated, the fastening is effected by rivets 6. However, it will be apparent that other conventional means may be employed such as bolts and nuts or welding.

Also secured to each of the posts 2, as by rivets 6, is a right-angle bracket member 7, the projecting arms 7a of which are aligned with the cross-members 3 and, at their outer ends, support a circular perch 8 on which poultry may stand in order to feed from the hopper. The perch may be detachably secured to the supporting arms 7a as by screws 9 so as to permit ready removal for cleaning or replacement.

The lower ends of the posts 2 are bent outwardly at right-angles to provide feet 2a which extend outwardly at equal distances, preferably at least to the perch 8 so as to provide stability and reduce the tendency for the hopper to upset when the load on the perch is unbalanced and the supply of feed in the hopper is low.

As best seen in Fig. 2, one of the hopper supporting cross-members 3 is provided at the middle with a U-bent portion 3a in which the middle of the other cross-member is secured, as by rivet 6a, so that the upper surfaces of both members 3 provide a level support in a horizontal plane for the circular bottom 10 of the hopper pan or container 4.

As best seen in Fig. 2, the pan 4 includes a vertical side wall 11 secured at its lower edge to the bottom 10 and provided with a rolled upper edge or lip 12 which snugly fits within the four vertical hopper posts 2. Removably located within the pan 4 is an inwardly and downwardly sloping truncated conical member 13, the lower edge of which rests on the bottom 10 while the upper edge loosely engages the side wall 11 of the pan. Located above the member 13 is a similar inwardly and downwardly sloping truncated conical member or shield 14 having a rolled upper edge or lip 15 which rests on the pan lip 12 and snugly engages the hopper posts 2. The lower edge 16 of the shield, preferably curves outwardly and is spaced from, and directly above, the lower edge or lip of sloping member 13.

As shown in Figs. 1 and 2, a downwardly and outwardly sloping conical hood 17 is detachably secured to downwardly and outwardly bent upper ends 18 of the posts 2. The ends 18 are inclined at the same angle as the conical slope of the cover 17. Attachment of the cover is effected by means of rivets 19 which are secured to and extend upwardly from each bent post end 18. As illustrated, each rivet 19 has a rounded head 19a at its upper end which may be passed through respective holes 20 in the cover. The attachment may be made easily by pressing downwardly on the cover 17, the pressure serving to cam the posts 2 inwardly so as to align and permit the rivet heads 19a to slip through and lock in the holes 20.

Detachment is effected as readily by pressing inwardly on the upper portion of the posts 2 while lifting the cover and withdrawing the rivet heads 19a through their aligned holes 20.

In the hopper shown in Figs. 1 and 2, the several parts of the pan 4 including members 10, 11, 13 and 14 and the hood 17 are formed of galvanized sheet, although it will be appreciated that other materials may be used in these members.

It has been found that for sixteen weeks and older poultry the bottom 10 of the pan preferably should be approximately six inches below the upper edge or lip 15 of the pan supported shield 14. Most effective results are obtained when the latter slopes from the horizontal inwardly and downwardly at an angle of 30° to a four inch diameter, circular opening defined by the lip 16.

In this preferred embodiment, the lip 16 is approximately two and one-half inches below the level of the top of the pan and approximately five inches removed along the slope of the shield from the upper lip 15. When the hopper is proportioned in the manner described, it also is preferable that the perch 8 be approximately two inches wide and spaced approximately four inches from the pan 4 and approximately five inches below the upper lip 15 of the shield 14. While the perch 8 may be located at ground level or even eliminated entirely, best results are obtained by locating the perch about six inches above the ground.

For young poultry a more shallow pan and a shield having a lesser dimension between lips 15 and 16 are necessary. A four inch deep pan with a shield measuring approximately three and one-half inches from the upper lip 15 to the lower lip 16 may be provided as alternate parts so as to permit the ready adaptment and adjustment of the hopper to the feeding of young poultry. The diameter of the alternate pans must be the same in order to fit the frame which may be provided in various sizes.

Figs. 3 and 4 show a long, rectangular hopper, generally designated by the letter B, which functions in much the same manner as the circular hopper heretofore described with reference to Figs. 1 and 2. The hopper B includes a frame generally designated 21 having four vertical corner posts 22 which support a rectangular pan 23. The lower ends of each end pair of corner posts 22 are securely fastened, as by welding, to projecting horizontal members 24 which form a firm supporting base for the frame. For greater stability, the posts 22 and base members 24 preferably are of L-shaped cross-section; the lateral or side flanges 22a and the end flanges 22b of the posts 22 also serving to restrain lateral and endwise movement of the pan when it is lowered between the posts 22.

Located above each of the base members 24 is a cross-member 25 formed of strap iron or the like, which is secured in a horizontal position to the end flanges 22b of each pair of end posts 22. Space tapped holes 26 in the posts provide for adjustment of the height above the base members 24 at which the members 25 are secured by screws 27. As shown in Figs. 3 and 4, the cross-members 25 project equal distances beyond the posts 22 and support at their ends 25a, perch rods 28 which extend along both sides of the pan 23.

As best seen in Fig. 5, there is secured to the inner surface of each of the cross-members 25, as by rivets 29, one side 30a of a bracket member 30 of L-shaped cross-section. The other side 30b, of each member 30, is disposed in a horizontal plane and extends inwardly to support the pan 23 at its ends.

The pan 23 may be formed of galvanized sheet, or other suitable material and, as shown in Figs. 3 and 4, includes a flat bottom portion 31, upwardly and outwardly curved intermediate wall partitions 32, vertical side walls 33 and vertical end walls 34. Walls 33 and 34 are provided with a continuous rolled upper edge 35 upon which rests the similarly rolled upper edge 36 of a rectangular shield generally designated 37. As shown in Figs. 3 and 4, the shield 37 includes inwardly and downwardly sloping side walls 38 and vertical end walls 39 the lower edges of which are rolled to define a rectangular opening 40 which is spaced from the sides and located centrally over the rectangular bottom portion 31 of the pan 23.

A spring 41 may be tensioned between wires 41a which are secured at their outer ends to the end walls 39 of the shield directly over the center line of the shield opening 40. The spring 41 and wires 41a prevent poultry from standing in the pan 23 and provide a non-maintainable perch which discourages attempts of the poultry to stand on it whenever the hopper may be used without its cover or hood 42.

The hood 42 is a gabled member having end walls 43 and downwardly and outwardly sloping covering walls 44 in which holes or eyes 45 are provided to receive, as shown in Figs. 3 and 4, the button or headed ends 46 of two rods 47 each of which is secured as in loops 48, at the upper ends of each end pair of posts 22. The cover 42 may be removed readily by merely exerting a slight inward pressure on the upper end of each of the posts 22 to align each button 46 with its hold 45 and then pulling the cover upwardly away from each button.

With the hood 42 removed, the shield 37 may be removed readily to permit filling the pan 23 with grain or other feed, and the pan itself may be removed for cleaning merely by raising it between the posts 22.

For efficient feeding of mature poultry, the shield walls 32 preferably slope at an angle of 30 degrees to the horizontal and provide an opening 40 approximately four inches wide as the only means of access to the feed in the pan 23.

As in the circular embodiment of the hopper shown in Figs. 1 and 2, the sloping walls 38 of the shield are approximately five inches wide with their upper edges 36 located approximately six inches above the perches 28.

It will be understood that the size of the hopper B and its parts may be decreased for young poultry, the proportional size and dimensions described for the circular hopper being applicable to hopper B.

In feeding from hoppers embodying this invention, the birds have to reach over the sloping shield to reach the grain. As they bring their heads back, grain which otherwise would be wasted, falls on the sloping shield and is fed back to the center of the hopper. Waste is negligible.

As the supply of feed directly under the feeding opening is diminished, the feed from other parts of the pan gravitates to the center and replenishes the supply available to the flock directly beneath the feeding opening in the shield.

It will be apparent that the form, construction and arrangement of the parts of the two described embodiments may be varied without departure from the scope of the invention as set forth in the following claims.

Having described my invention, I claim:

1. A poultry feeder including a feed pan having a bottom portion and an inwardly and downwardly sloping wall portion, a shield generally covering said pan and having ends, and inwardly and downwardly sloping wall portions defining a centrally located opening which provides the sole access to the pan, said shield being removably supported by and on said pan, a frame supporting said pan and preventing lateral movement of said shield relative to said pan, a hood covering said pan and removably secured to said frame, and means for adjusting the height of the pan relative to the hood and the frame.

2. A poultry feeder as described in claim 1 and including a perch secured to the frame, said perch being adjustable relative to said frame and said hood.

3. A poultry feeder as recited in claim 2 and wherein the pan and shield are vertically adjustable concurrently with said perch relative to said frame and hood.

4. A poultry feeder including a feed pan having a bottom portion and an inwardly and downwardly sloping wall portion, a shield spaced from said bottom portion and supported by the pan, said shield sloping inwardly and downwardly at an angle not less than 30 degrees to the horizontal and having an opening centrally located above said bottom member and providing access to said pan, a perch spaced from and at approximately the elevation of said bottom member, the upper edge of said sloping shield being between four and six inches of the bottom of said pan and between three and five inches from the edge of said central opening in said shield, a frame supporting the pan not less than its depth from the ground, and a hood covering said pan and detachably secured to said frame, said pan and shield being vertically adjustable and non-laterally movable relative to said frame and hood.

CHARLES A. POTTER.

References Cited in the file of this patent

UNITED STATES PATENTS

| Number | Name | Date |
|---|---|---|
| 395,490 | French | Jan. 1, 1889 |
| 405,260 | Jacob | June 18, 1889 |
| 1,159,190 | Derr | Nov. 2, 1915 |
| 1,558,316 | Tipple | Oct. 20, 1925 |
| 1,561,299 | Banks | Nov. 10, 1925 |
| 1,610,614 | McCollough | Dec. 14, 1926 |
| 1,666,322 | West | Apr. 17, 1928 |
| 1,890,778 | German | Dec. 13, 1932 |
| 1,906,016 | Stecher | Apr. 25, 1933 |
| 2,080,672 | Perrich | May 18, 1937 |

FOREIGN PATENTS

| Number | Country | Date |
|---|---|---|
| 140 | Great Britain | Feb. 22, 1896 |